No. 776,022. PATENTED NOV. 29, 1904.
N. HALVORSEN.
TRUSS ROD FOR VEHICLE AXLES.
APPLICATION FILED FEB. 1, 1904.
NO MODEL.
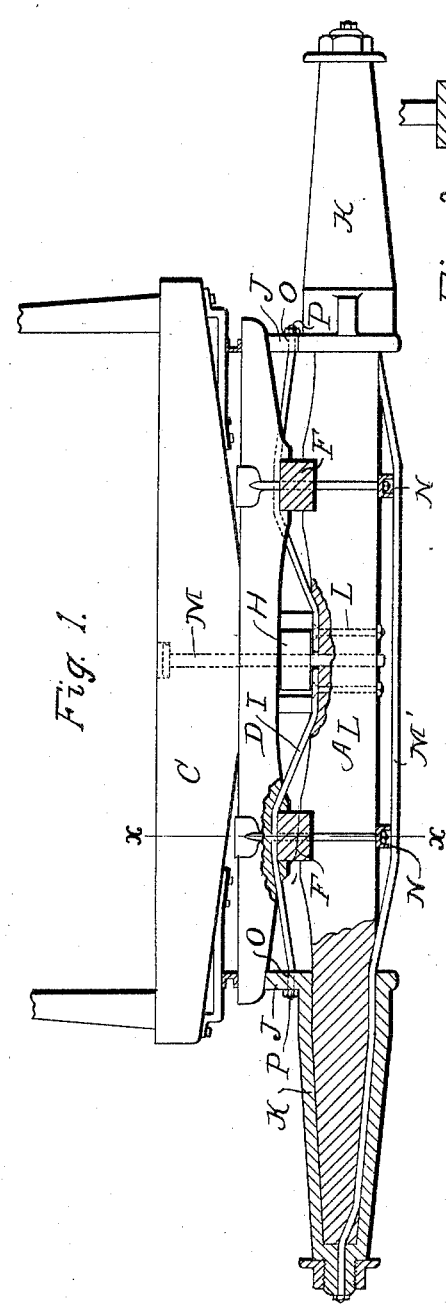
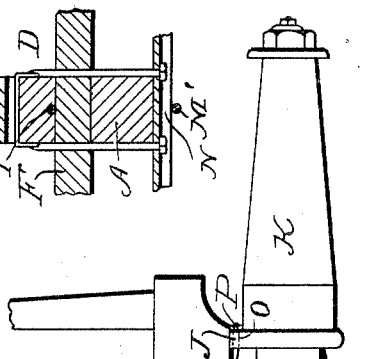
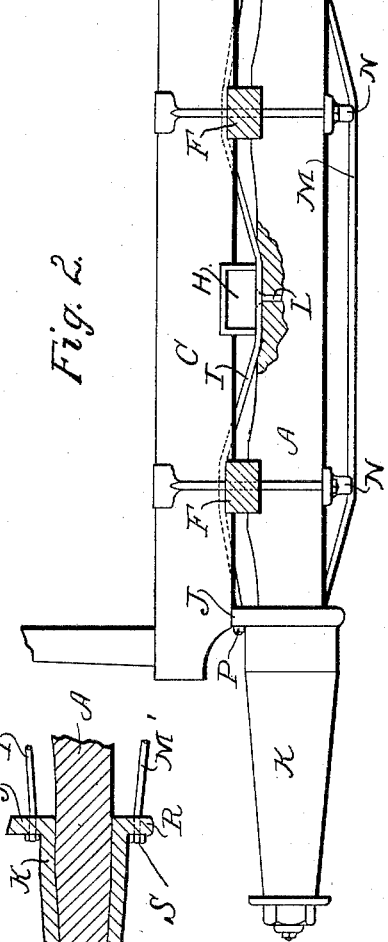
WITNESSES:
INVENTOR
Nels Halvorsen
BY
ATTORNEYS.

No. 776,022.

Patented November 29, 1904.

UNITED STATES PATENT OFFICE.

NELS HALVORSEN, OF STOUGHTON, WISCONSIN.

TRUSS-ROD FOR VEHICLE-AXLES.

SPECIFICATION forming part of Letters Patent No. 776,022, dated November 29, 1904.

Application filed February 1, 1904. Serial No. 191,435. (No model.)

*To all whom it may concern:*

Be it known that I, NELS HALVORSEN, a citizen of the United States, residing at Stoughton, county of Dane, and State of Wisconsin, have invented new and useful Improvements in Truss-Rods for Vehicle-Axles, of which the following is a specification.

My invention relates to improvements in the running-gear of vehicles; and it pertains more especially to the mechanism used in connection with the front and rear axles of heavy wagons by which the same are not only strengthened, but the load, which usually bears heaviest at the center of the axle, is more uniformly distributed, and the center of the axle, which is subject to the greatest strain, is reinforced, so that the liability of the axle breaking or being sprung out of shape is diminished.

My invention is further explained by reference to the accompanying drawings, in which—

Figure 1 represents a front view of the front axle. Fig. 2 represents a front view of the rear axle. Fig. 3 represents a vertical section drawn on line *x x* of Fig. 1. Fig. 4 represents a modified form of the lower truss-rod connection.

Like parts are identified by the same reference-letters throughout the several views.

The wagon-axle A, bolster C, sand-bar D, hounds F, and reach H are constructed in the ordinary manner.

The present invention pertains, primarily, to the construction and arrangement of the truss-rod I and the means for connecting the same with the axle and coöperating parts. The truss-rod I is preferably formed of a single rod of iron, which extends from near one end of the axle to the other, and the respective ends are anchored in the shoulders J, which are formed integrally with the upper side of the skeins K and pass over the upper side of the hounds F and from thence downwardly beneath the reach H. It will be understood that by this arrangement the strain upon the center of the axle is resisted by the tensile strength of said truss-rod. The truss-rod I is centrally secured to the rear axle by a single bolt L and to the front axle by two bolts L, one on each side of the king-bolt M. For the front axle the truss-rod I is preferably formed in two parts terminating on the respective sides of the king-bolt. Said truss-rod may, however, be formed in one continuous piece by flattening the center and perforating it at such point for the reception of the king-bolt. The anchorage-shoulders J are preferably made of sufficient height to support the outer ends of the sand-bar D above the front axle and the outer ends of the bolster C. Thus said shoulders serve the twofold purpose of anchorage-bearings for the truss-rods and supports for the bolster and sand-bar.

When manufacturing wagons for specially heavy duty, I preferably employ an additional rod M' beneath the axle A, the respective ends of which are connected with the skeins K in the ordinary manner, while the central portion extends longitudinally beneath the axle and is supported near the respective ends of the axle by the intermediate blocks or nuts N, whereby the weight upon the axle at such points is resisted by the tensile strength of said lower truss-rod. While the anchorage-bearings of the truss-rods I are preferably formed integrally with the skeins of the axle, they are not necessarily thus formed, but such anchorage-bearings may be formed separately and secured to the axle independently of said skeins.

It will be understood that the anchorage shoulders or bearings J are provided with apertures O for the reception of the respective ends of the truss-rods, which are inserted through said apertures and secured in place by nuts P, operating on screw-threaded bearings formed on the ends of said truss-rods, whereby the slack, if any, in said truss-rods may be taken up so as to better support the weight upon the axle.

By the modified form of truss-rod connection shown in Fig. 4 the respective ends of the truss-rod M' are connected with the respective axle-skeins K by the anchorage-shoulders R and nuts S.

Having thus described my invention, what

I claim as new, and desire to secure by Letters Patent, is—

1. The combination with a vehicle-axle of two anchorage-bearings respectively secured thereto near its respective ends; a metallic truss secured at its outer ends to said anchorage-bearings and extending from thence upwardly and longitudinally of the axle over the upper side of the respective hounds, thence downwardly beneath the reach of the wagon and means for securing such rod centrally to the axle.

2. The combination with a vehicle-axle, of two anchorage-bearings formed integrally with the respective axle-skeins; a truss-rod secured at its respective ends to said anchorage-bearings and extending from thence upwardly and longitudinally of the axle over the upper side of the respective hounds and from thence downwardly beneath the wagon-reach and means for securing said truss-rod centrally to the axle.

3. The combination with the front and rear axles of a wagon, of anchorage-bearings formed integrally with the axle-skeins and extending upwardly therefrom, the anchorage-bearings of the front axle being adapted to support the outer ends of the sand-bar, while the anchorage-bearings of the rear axles serve as a support for the rear bolster; a truss-rod secured at its outer ends to said anchorage-bearings and extending from thence upwardly and longitudinally of the axles over the upper side of the respective hounds and from thence downwardly to and beneath the wagon-reach and means for securing said truss-rods centrally to the axles at such point.

4. The combination with the respective axles of a wagon, of anchorage-bearings formed integrally with the axle-skeins; metallic truss-rods secured at their outer ends to said anchorage-bearings and extending from thence upwardly and longitudinally of the axles over the upper side of the respective hounds and thence downwardly toward the center of the axles beneath the reach, means for securing said truss-rod at its center to the axle; a second truss-rod located centrally beneath the axles and longitudinally thereof, said second truss-rod being secured at its respective ends to the respective axle-skeins, and rod-supporting bearings interposed between said second truss-rod and the lower surface of the axles, all substantially as, and for the purpose specified.

5. The combination with the respective axles of a wagon, of axle-skeins provided with both upwardly and downwardly projecting anchorage-shoulders formed integrally with said skeins; metallic truss-rods secured at their ends to the upper projecting anchorage-shoulders of said skeins and extending from thence upwardly and longitudinally of the axle on the upper sides of the respective hounds and from thence downwardly toward the center of the axle; means for securing said truss-rods at their centers to the axles; lower truss-rods located centrally beneath the respective axles and longitudinally thereof and secured at their respective ends to the downward-projecting anchorage-shoulders of the skeins of the respective axles and rod-supporting bearings interposed between said lower truss-rods and the lower sides of the axles, all substantially as and for the purpose specified.

In testimony whereof I affix my signature in the presence of two witnesses.

NELS HALVORSEN.

Witnesses:
F. J. VEA,
A. E. AUSSE.